United States Patent [19]
Brandt et al.

[11] Patent Number: 5,328,229
[45] Date of Patent: Jul. 12, 1994

[54] CLOSING APPARATUS FOR A FOLDING ROOF OF CONVERTIBLES

[75] Inventors: Armin Brandt, Harsewinkel; Wolfgang Richter, Wallenhorst, both of Fed. Rep. of Germany

[73] Assignee: Wilhelm Karmann GmbH, Osnabrück, Fed. Rep. of Germany

[21] Appl. No.: 26,709

[22] Filed: Mar. 5, 1993

[30] Foreign Application Priority Data

Mar. 11, 1992 [DE] Fed. Rep. of Germany ....... 9203285

[51] Int. Cl.$^5$ ............................................. B60J 7/08
[52] U.S. Cl. ............................ 296/121; 292/DIG. 5
[58] Field of Search ............... 296/121; 292/DIG. 5, 292/DIG. 49, 113, 56

[56] References Cited

U.S. PATENT DOCUMENTS

| 2,305,715 | 12/1942 | Keller | 292/DIG. 5 X |
| 2,486,905 | 11/1949 | Ackermans | 292/DIG. 5 X |
| 2,586,648 | 2/1952 | Hale et al. | 292/DIG. 5 X |
| 2,674,480 | 4/1954 | Vigmostad | 292/DIG. 5 X |
| 2,709,621 | 5/1955 | Votypka et al. | 292/DIG. 5 X |
| 2,739,012 | 3/1956 | Ziff | 292/DIG. 5 X |
| 4,101,161 | 7/1978 | Currall | 292/DIG. 5 X |
| 4,223,943 | 9/1980 | VanHulle et al. | 292/DIG. 5 X |

FOREIGN PATENT DOCUMENTS 134816 11/1929 Switzerland ..................... 296/121

Primary Examiner—David M. Mitchell
Assistant Examiner—Gary C. Hoge
Attorney, Agent, or Firm—Jordan and Hamburg

[57] ABSTRACT

A closing apparatus for a convertible roof of a convertible vehicle comprises two locking organs (9, 10), which in the closing position of the folding roof (1) each engage an anchoring bracket (11, 12) at the windshield frame (3) and by means of at least one operating handle (15) lock in the closing position and disengage from the anchoring brackets (11, 12) when opening. For this purpose, the locking organs (9, 10) are connected over a connecting element (14), which imparts a synchronous swivelling motion and to which an operating handle (15), which is constructed as a one-hand swivelling handle, is centrally assigned.

8 Claims, 4 Drawing Sheets

CLOSING APPARATUS FOR A FOLDING ROOF OF CONVERTIBLES

BACKGROUND OF THE INVENTION

The invention relates to a closing apparatus for a folding roof of a convertible.

Such closing apparatuses for a folding roof of convertibles have locking mechanisms in such a form that, in each case, at the front region of the folding roof, plug-in and locking elements, which can be connected with the vehicle body, particularly an upper cross-beam of the windshield frame, are formed, which position the closed folding roof in its closed position at the upper edge of the windshield frame an then fix it in its installed position by means of two manually operated locking hooks. Aside from this solution, which is complicated to handle, locking elements are known, with which the folding roof can be brought by means of two bolt locks over a turn and tilt latching device moving their closing elements with a single-hand manipulation into the closed position or can be unlocked from this closed position in the reverse sequence. The locking mechanism, which goes along with this, is associated with a design configuration, which is expensive structurally, in order to make an easy operation possible.

SUMMARY OF THE INVENTION

It is an objective of the invention to provide a closing apparatus for a folding roof of a convertible vehicle which, with little constructive effort, makes a user friendly locking and unlocking of the folding roof possible.

With a few individual components, the invention provides a locking apparatus, with which the two locking organs are connected over the only one connecting element with sufficient twist resistance, so that the locking and unlocking motions as well as the motion of the whole folding roof can be carried out with high operating comfort with the centrally allocated, one-hand swivelling handle and, for example when, the folding roof is being closed, an accurate positioning of the locking organs with respect to the anchoring brackets and, without changing the gripping position once again, a synchronous locking of the locking organs is attainable.

Appropriate design of the individual parts of the locking apparatus makes possible their advantageous integration in the roof lining, so that, with little effort, an optically uniform inner roof surface is formed in the closed position of the folding roof. This can be attained particularly if, in accordance with the utility patent 91 08 242.0, a dimensionally stable shell for the folding roof is provided in the front part of the folding roof.

BRIEF DESCRIPTION OF THE DRAWINGS

With respect to further advantages and details, reference is made to the following description and drawing, in which an embodiment of the object of the invention is illustrated diagrammatically in greater detail. In the drawing.

DESCRIPTION OF THE PREFERRED EMBODIMENTS

Figure 1:
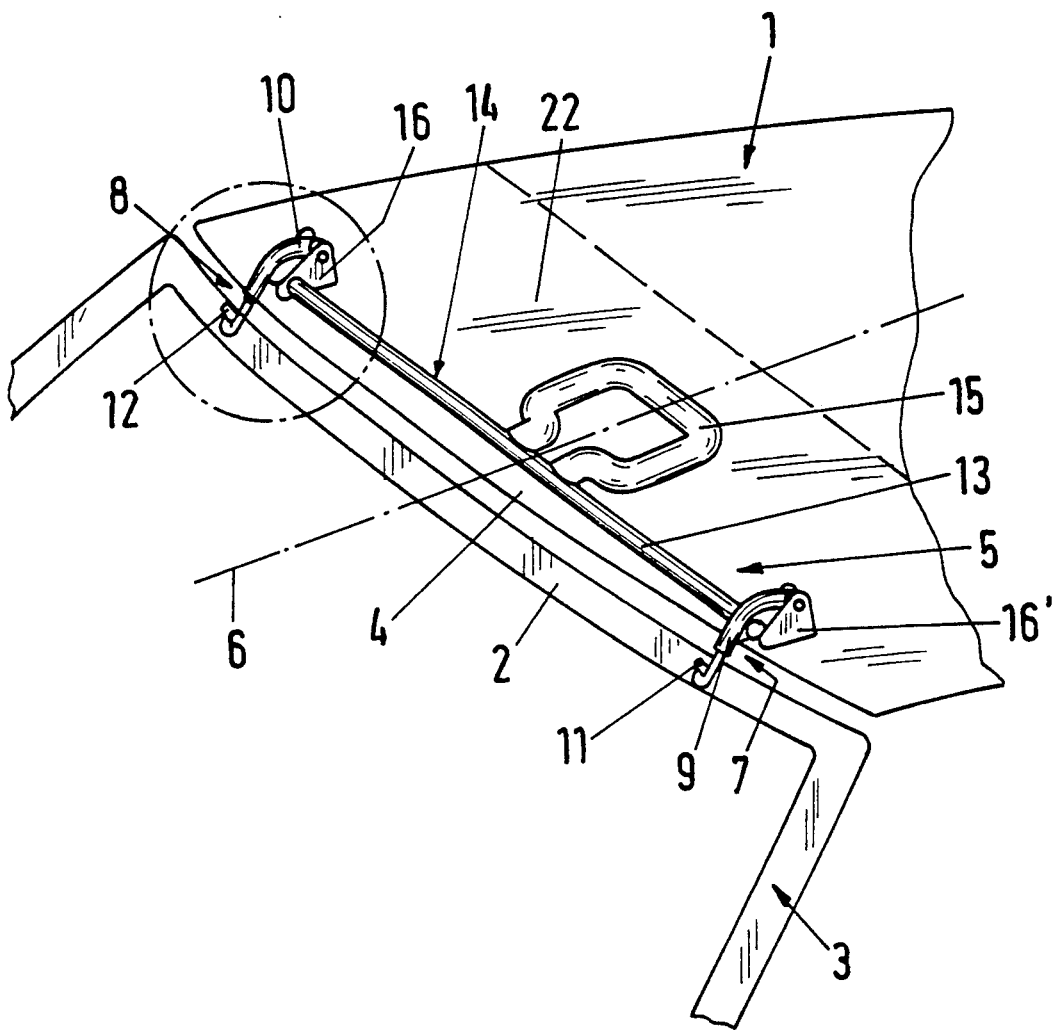
FIG. 1 shows a partially sectional, perspective representation of a convertible vehicle in the area of the windshield with an inventive closing apparatus in a closed position.

FIG. 1 shows a folding roof 1 of a convertible vehicle. The folding roof 1 is in a closed position in the area of an upper frame brace 2 of a windshield frame 3. Near the front edge 4 of the folding roof 1, a closing apparatus 5 is provided, which has two closing areas 7, 8, which are parallel to a central plane 6 of the vehicle and in each of which a locking organ 9, 10 engages an anchoring bracket 11, 12 in the area of the frame brace 2.

Figure 3:
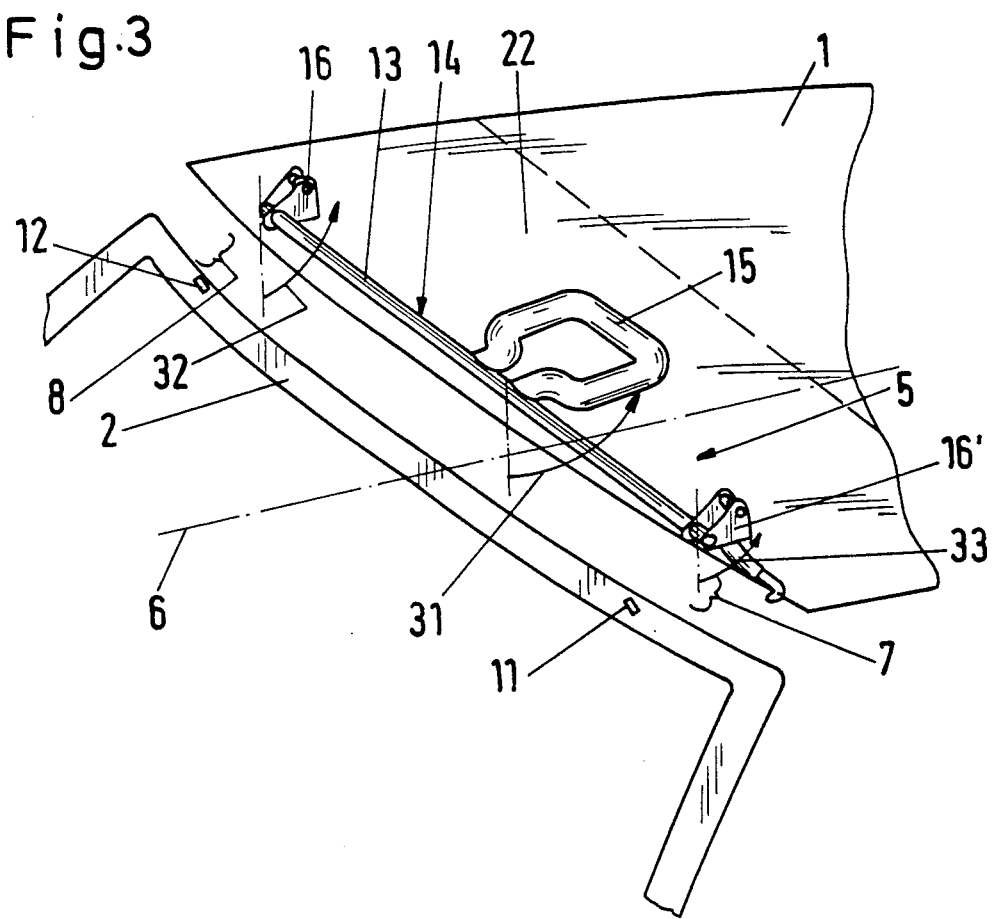
FIG. 3 shows a basic representation similar to that of FIGS. 1 or 2 with the locking apparatus in an open position and FIG. 4 shows on an enlarged scale the closing apparatus in the area of one end of a tubular connecting element.
Figure 4:
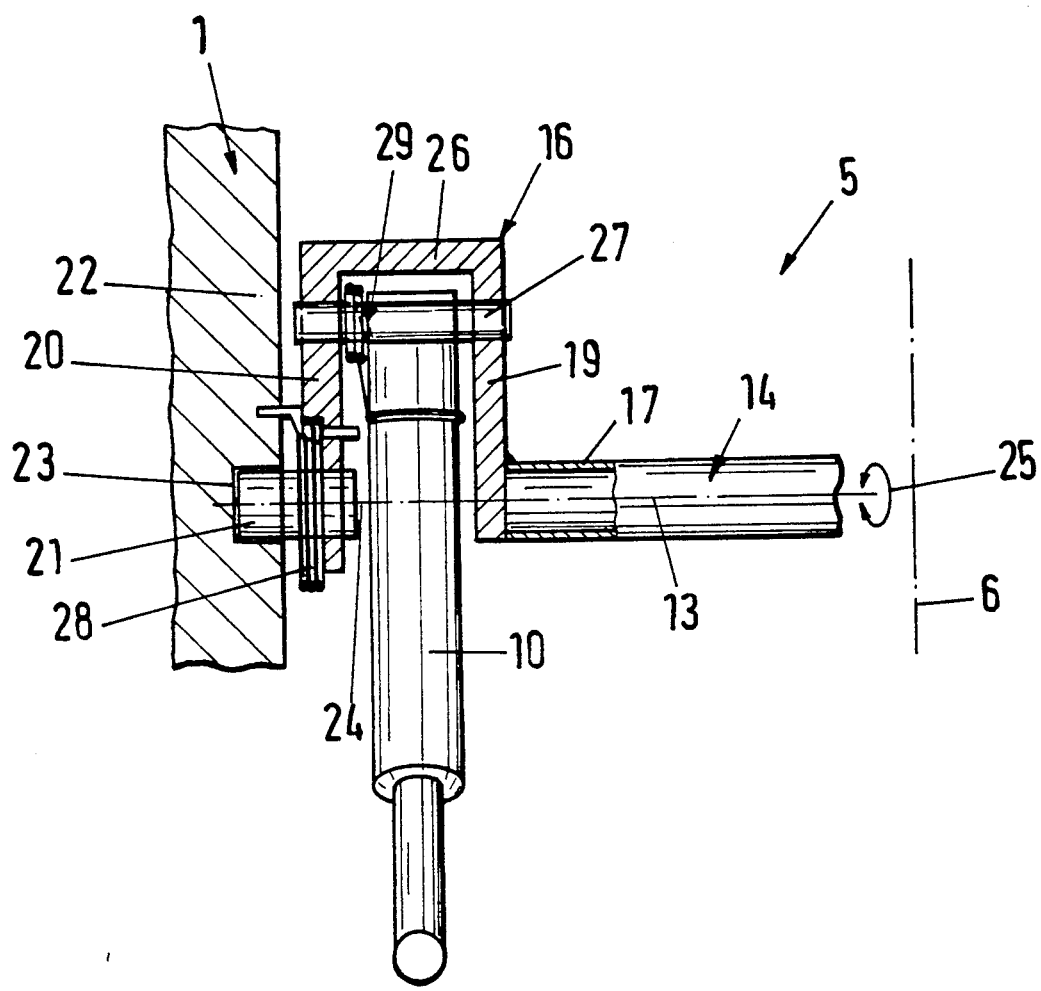

In the area of the ends of the locking organs 9, 10, which are directed to the folding roof 1, these locking organs 9, 10 are connected with one another over a connecting element 14 having a connecting axis 13 in such a manner, that a synchronous swivelling motion of the locking organs 9, 10 supported in the respective closing area 7, 8 can be initiated with an operating handle 15, which is located in the central plane 6 of the vehicle and is constructed as a one-hand swivelling handle (FIGS. 3 and 4).

Figure 4A:
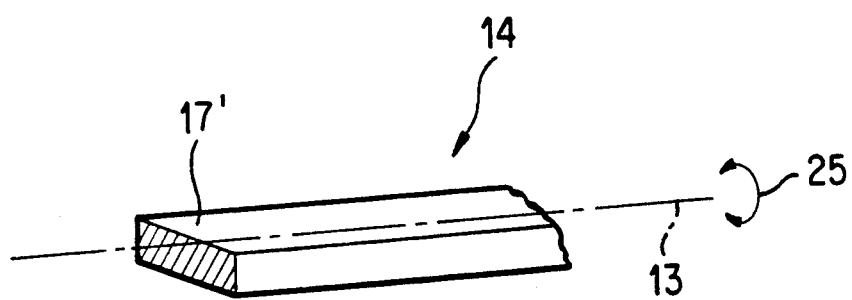
FIG. 4A shows an alternative embodiment in which the connecting element is in the form of a flat bar.

An enlarged detail, shown in FIG. 4, illustrates that the locking organs 9, 10, which are at the ends of the connecting element 14, are accommodated in a holding body 16 (or 16' at the other end) which, in turn, is supported at the folding roof 1 so that it can swivel. In the embodiment shown, the connecting element 14, which is connected and, in particular, welded to the holding body 16, is formed from a distortion-resistant tube 17. Instead of this tube 17, it is also possible to provide flat material indicated at 17' in FIG. 4A. With that, the connecting element 14 as a whole is sufficiently elastic and inherently distortion resistant, so that the forces acting over the operating handle 15 can be taken up reliably.

The holding body 16 advisably is constructed as a U-shaped profile body, which has a supporting leg 19, which is directed to the central plane 6 of the vehicle and is connected with the connecting element 14. Parallel to and at a distance from this supporting leg 19, an outer supporting leg 20 is provided, which supports the holding body 16 as a whole at the folding roof with a stay bolt 21 or at a dimensionally stable shell 22 for the roof pivotably in a form recess 23.

In the swivelling position of the closing apparatus 5 of FIG. 4, the connecting axis 13 and a stay bolt axis area 24 form a common swivelling axis, about which the components can be moved simultaneously in an arrow direction 25.

In an appropriate embodiment, the locking organs 9, 10 are pivotably supported in their respective holding bodies 16, 16' in each case between the supporting legs 19, 20 close to a base leg 26 over a king pin 27 (FIG. 4), so that an additional pivoting axis is formed for the locking organs 9, 10.

Furthermore, in the respective closing areas 7, 8 of the closing apparatus 5, a restoring spring 28 is wrapped around the stay bolt 21 between the outer supporting leg 20 and the folding roof 1, and a restoring spring 29 is wrapped around the king pin 27 in the respective end region of the locking organ 9, 10, so that the individual parts of the closing apparatus 5 can be positioned therewith into the respective nominal positions, for example, under the action of the forces initiated over the operating handle 15.

In a further embodiment, eccentric elements (not shown) can be provided in the region of the locking organs 9, 10, which protrude with their ends into the respective holding bodies 16, 16'. These eccentric elements control the position of the locking organs 9, 10 and are effectively operated in the various closing and opening positions over the connecting element 14.

Figure 2:
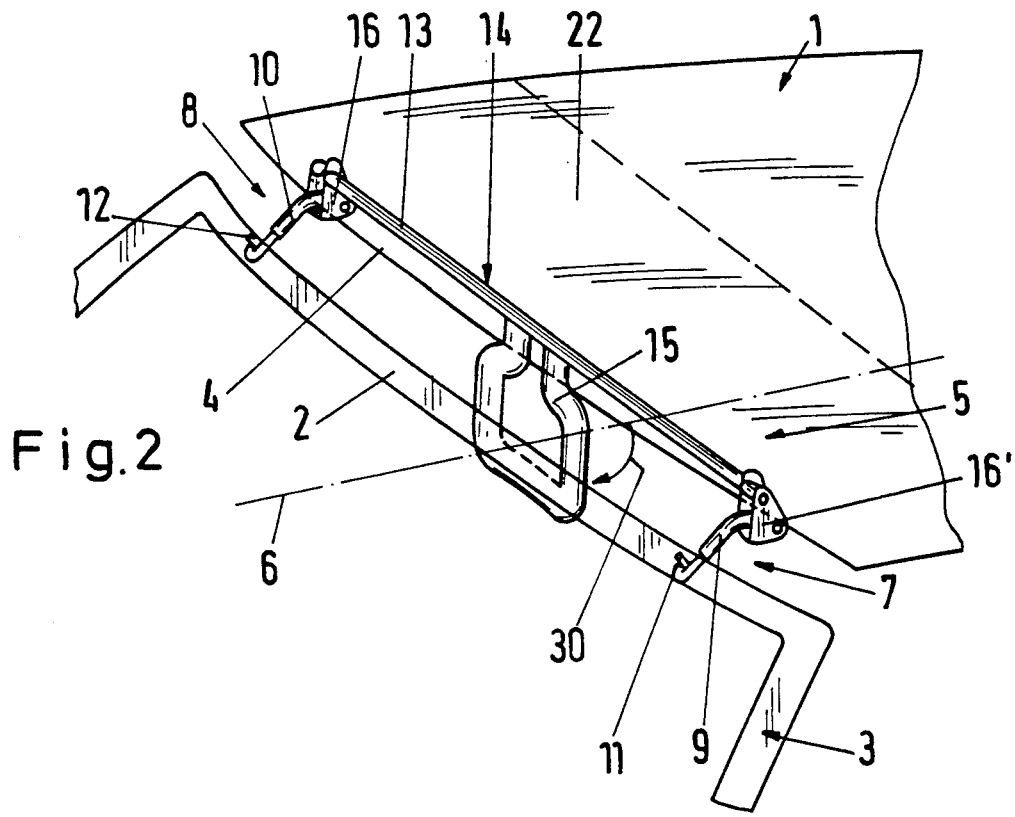
FIG. 2 shows a basic representation similar to that of FIG. 1, with the closing apparatus in a first opening phase.

In FIGS. 2 and 3, different opening phases of the individual parts of the closing apparatus are shown, by way of example, for the function of the closing apparatus 5 while carrying out an opening motion for the folding roof 1. The operating handle 15, which is in the closing position in FIG. 1, can be swivelled in a first motion phase corresponding to FIG. 2 in an arrow direction 30 towards the windshield frame 3, so that the respective holding bodies 16, 16' swivel over the connecting element 14 in the same direction and, at the same time, raise the folding roof 1 as a whole and relieve the load on the locking organs 9, 10 in such a manner, that these can be swung out in a second motion phase (FIG. 3) as the operating handle 15 is being swivelled in an arrow direction 31 out of the anchoring brackets 11, 12 in the directions of motion 32, 33 and the folding roof 1 can be moved into the rear part of the vehicle (not shown) without changing the grip position once again.

To lock the folding roof 1 of the vehicle, the motion processes described above can be carried out in the reverse sequence, the one-hand swivelling handle 15 enabling the folding roof 1 of the convertible vehicle to be closed with a high degree of operator comfort.

We claim:

1. A closing apparatus for a folding roof of a convertible vehicle having a windshield frame, said closing apparatus comprising:
   first and second anchoring brackets secured in spaced relation to said windshield frame;
   first and second locking organ means for engaging said first and second anchoring brackets, respectively, when said folding roof is in a closed position, said first and second locking organ means being connected with said roof;
   connecting element means for connecting said first and second locking organ means and for imparting a synchronous swivelling motion to said first and second locking organ means;
   operating handle means, substantially centrally connected with said connecting element means, for controlling said connecting element means to impart said synchronous swivelling motion;
   first and second holding body means for pivotally connecting said first and second locking organ means to said roof, said first and second holding body means being pivotally connected to said folding roof, said connecting element means including opposite ends connected with said first and second holding body means, respectively;
   each of said holding body means has a substantially U-shaped cross-sectional configuration including:
   an inner supporting leg substantially parallel and spaced from a central vertical plane of the vehicle, said inner supporting leg being connected with one said end of said connecting element means,
   an outer supporting leg substantially parallel and spaced apart from said inner supporting leg, and
   stay bolt means for pivotally connecting said outer supporting leg to the folding roof;
   said stay bolt means and said connecting element means having a common swivel axis in end regions containing said first and second holding body means.

2. A closing apparatus according to claim 1, wherein said connecting element means is made from a flat material.

3. A closing apparatus according to claim 1, wherein said connecting element means is made from an elastic material.

4. A closing apparatus for a folding roof of a convertible vehicle having a windshield frame, said closing apparatus comprising:
   first and second anchoring brackets secured in spaced relation to said windshield frame;
   first and second locking organ means for engaging said first and second anchoring brackets, respectively, when said folding roof is in a closed position, said first and second locking organ means being connected with said roof;
   connecting element means for connecting said first and second locking organ means and for imparting a synchronous swivelling motion to said first and second locking organ means;
   operating handle means, substantially centrally connected with said connecting element means, for controlling said connecting element means to impart said synchronous swivelling motion;
   first and second holding body means for pivotally connecting said first and second locking organ means to said roof, said first and second holding body means being pivotally connected to said folding roof, said connecting element means including opposite ends connected with said first and second holding body means, respectively;
   each of said holding body means has a substantially U-shaped cross-sectional configuration including:
   an inner supporting leg substantially parallel and spaced from a central vertical plane of the vehicle, said inner supporting leg being connected with one said end of said connecting element means,
   an outer supporting leg substantially parallel and spaced apart from said inner supporting leg, and
   stay bolt means for pivotally connecting said outer supporting leg to the folding roof;
   each of said holding body means further including a base leg interconnecting said inner and outer supporting legs, and further including king pin means for pivotally supporting each said locking organ means between said inner and outer supporting legs and adjacent said base leg of a respective said holding body means.

5. A closing apparatus according to claim 4, further including restoring spring means, positioned between each said outer supporting leg and the folding roof, for biasing each said holding body means in a first rotational direction relative to said folding roof.

6. A closing apparatus according to claim 5, wherein each said restoring spring means is wrapped about a respective said stay bolt means.

7. A closing apparatus for a folding roof of a convertible vehicle having a windshield frame, said closing apparatus comprising:

first and second anchoring brackets secured in spaced relation to said windshield frame;

first and second locking organ means for engaging said first and second anchoring brackets, respectively, when said folding roof is in a closed position, said first and second locking organ means being connected with said roof;

first and second holding body means for pivotally connecting said first and second locking organ means to said roof;

connecting element means for connecting said first and second locking organ means and for imparting a synchronous swivelling motion to said first and second locking organ means;

operating handle means, substantially centrally connected with said connecting element means, for controlling said connecting element means to impart said synchronous swivelling motion;

first restoring spring means, positioned between said first locking organ means and said first holding body means, for biasing said first locking organ means in a first rotational direction relative to said first holding body means; and second restoring spring means, positioned between said second locking organ means and said second holding body means, for biasing said second locking organ means in said first rotational direction relative to said second holding body means.

8. A closing apparatus according to claim 7, wherein said first and second holding means each comprise a king pin means for pivotally connecting said first and second locking organ means to said roof, and each said restoring spring means is wrapped about a respective said king pin means, and is connected between said king pin means and the respective said locking organ means.

* * * * *